United States Patent
Dakshinamoorthy et al.

(10) Patent No.: US 8,036,220 B2
(45) Date of Patent: Oct. 11, 2011

(54) PRE-DROPPING OF A PACKET IF ITS TIME-TO-LIVE (TTL) VALUE IS NOT LARGE ENOUGH TO REACH A DESTINATION

(75) Inventors: Karthik Dakshinamoorthy, Karnataka (IN); Bhaskar Srinivasan, Karnataka (IN)

(73) Assignee: Cisco Technology, Inc, San Jose, CA (US)

( * ) Notice: Subject to any disclaimer, the term of this patent is extended or adjusted under 35 U.S.C. 154(b) by 0 days.

(21) Appl. No.: 12/185,109

(22) Filed: Aug. 3, 2008

(65) Prior Publication Data

US 2009/0316697 A1    Dec. 24, 2009

(30) Foreign Application Priority Data

Jun. 20, 2008    (IN) .............. 1479/DEL/2008

(51) Int. Cl.
*H04L 12/28* (2006.01)
*H04L 12/56* (2006.01)
*G06F 15/173* (2006.01)
(52) U.S. Cl. ......... 370/390; 370/392; 709/238; 709/243
(58) Field of Classification Search .............. 370/390, 370/392; 709/238, 243
See application file for complete search history.

(56) References Cited

U.S. PATENT DOCUMENTS

| | | | | |
|---|---|---|---|---|
| 6,611,872 | B1 * | 8/2003 | McCanne | 709/238 |
| 2002/0191584 | A1 * | 12/2002 | Korus et al. | 370/349 |
| 2005/0027782 | A1 * | 2/2005 | Jalan et al. | 709/200 |
| 2006/0088031 | A1 * | 4/2006 | Nalawade | 370/390 |
| 2006/0221963 | A1 * | 10/2006 | Takayanagi et al. | 370/390 |
| 2008/0144523 | A1 * | 6/2008 | Nishi et al. | 370/253 |
| 2008/0159163 | A1 * | 7/2008 | Valli | 370/252 |

OTHER PUBLICATIONS

RFC 1584 (Moy, "Multicast Extensions to OSPF", Published: Mar. 1994;).*
Meyer, "Administratively Scoped IP Multicast," RFC 2365, The Internet Society, Jul. 1998, 8 pages.
Hanna et al., "Multicast Address Dynamic Client Allocation Protocol (MADCAP)," RFC 2730, The Internet Society, Dec. 1999, 53 pages.
Fenner et al, "Protocol Independent Multicast—Sparse Mode (PIM-SM): Protocol Specification (Revised)," RFC 4601, The Internet Society, Aug. 2006, 150 pages.

* cited by examiner

*Primary Examiner* — Ayaz Sheikh
*Assistant Examiner* — Tarell Hampton
(74) *Attorney, Agent, or Firm* — The Law Office of Kirk D. Williams (57) ABSTRACT

A packet is pre-dropped if its Time-To-Live (TTL) value is not large enough to reach a destination, such as, but not limited to, its destination if it is a unicast packet, or at least one more destination for a multicast packet. A packet switching device maintains associations between (a) nearest receiving node distances and (b) prefixes or complete addresses. If a packet does not have enough TTL to reach an intended recipient identified by a corresponding nearest receiving node distance, then the packet is dropped even though the TTL has not expired. In this manner, some bandwidth and other network resources are not wasted on traffic that will timeout via the TTL mechanism before reaching a subsequent intended recipient.

19 Claims, 8 Drawing Sheets

PRE-DROPPING OF A PACKET IF ITS TIME-TO-LIVE (TTL) VALUE IS NOT LARGE ENOUGH TO REACH A DESTINATION

TECHNICAL FIELD

The present disclosure relates generally to communications and computer systems, especially routers, packet switching systems, and other network devices.

BACKGROUND

Internet Protocol (IP) packets are aged in a network in order to cause the dropping of those packets that do not reach its destination within a specified duration. Time-to-live (TTL) is a value in a header of an Internet Protocol (IP) packet that tells a network device whether or not the packet has been in the network too long and should be discarded. Typically, the TTL reflects a number of hop counts that the packet is allowed to traverse in a network before being discarded. For each received IP packet, a networked node typically decrements the TTL field. When the count reaches zero, the networked device detecting it discards the packet and typically sends an Internet Control Message Protocol (ICMP) message back to the originating host notifying that the packet was dropped due to a TTL expiration.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with pre-dropping of a packet if its Time-To-Live (TTL) value is not large enough to reach a destination, such as, but not limited to, its destination if it is a unicast packet, or at least one subsequent destination for a multicast packet. In one embodiment, a packet switching device: maintains associations between (a) nearest receiving node distances and (b) prefixes or complete addresses. For each particular packet of a plurality of packets: the packet switching device: (a) receives the particular packet, including a particular Time-To-Live (TTL) and a particular destination address in the header of the particular packet; (b) determines a particular nearest receiving node distance based on the particular destination address, which includes performing a lookup operation on said associations based on the particular destination address; and (c) in response to determining whether or not the particular TTL is large enough for the particular packet to reach at least one destination node based on the particular nearest receiving node distance: causes the particular packet to be forwarded if said determination was that the particular TTL is large enough for reaching at least one destination node, else causes the particular packet to be dropped. In one embodiment, the associations between (a) nearest receiving node distances and (b) prefixes or complete addresses are maintained for the entire packet switching device. In one embodiment, the associations between (a) nearest receiving node distances and (b) prefixes or complete addresses are maintained on a per interface basis of the packet switching device, which allows, for example, a multicast packet to be sent from one interface (as it has enough TTL to reach at least one more destination from that interface), but not from another interface (as it does not have enough TTL to reach at least one more destination from that interface).

2. Description

Disclosed are, inter alia, methods, apparatus, computer-storage media, mechanisms, and means associated with pre-dropping of a packet if its Time-To-Live (TTL) value is not large enough to reach a destination, such as, but not limited to, its destination if it is a unicast packet, or at least one subsequent destination for a multicast packet. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

Disclosed are, inter alia, methods, apparatus, computer-storage media, mechanisms, and means associated with pre-dropping of a packet if its Time-To-Live (TTL) value is not large enough to reach a destination, such as, but not limited to, its destination if it is a unicast packet, or at least one subsequent destination for a multicast packet. One embodiment is performed by a packet switching device, which performs operations including: maintaining, in the packet switching device, associations between (a) nearest receiving node distances and (b) prefixes or complete addresses; and for each particular packet of a plurality of packets: (a) receiving the particular packet, including a particular Time-To-Live (TTL) and a particular destination address in the header of the particular packet; (b) determining a particular nearest receiving node distance based on the particular destination address, which includes performing a lookup operation on said associations based on the particular destination address; and (c) in response to determining whether or not the particular TTL is large enough for the particular packet to reach at least one destination node based on the particular nearest receiving node distance: causing the particular packet to be forwarded if said determination was that the particular TTL is large enough for reaching at least one destination node, else causing the particular packet to be dropped.

In one embodiment, each of the plurality of packets is a multicast packet. In one embodiment, the packet switching device includes a plurality of interfaces, and wherein one or more of said maintained associations are maintained on a per interface basis. In one embodiment, the packet switching device includes a plurality of interfaces, and wherein the packet switching device associates a different nearest receiving node distance for at least two different interfaces of the plurality of interfaces for a same prefix or complete address. In one embodiment, said maintaining associations includes: updating said associations in response to receiving a particular message including a specific nearest receiving node distance for a specific prefix or complete address from another packet switching device or node communicatively coupled to the packet switching device. In one embodiment, said updating said associations is performed further in response to determining that a currently stored nearest receiving node distance for the specific prefix or complete address is greater than the specified nearest receiving node distance. One embodiment includes: increasing the specific nearest receiving node distance; and sending a message to another packet switching device, with the message including said increased specific nearest receiving node distance and the specific prefix or complete address. In one embodiment, each of the plurality of packets is a unicast packet.

One embodiment includes a packet switching device, comprising: one or more computer-readable memory; and one or more processors configured: (1) to maintain one or more data structures stored in the packet switching device in said one or more computer-readable media, said one or more data structures including associations between (a) nearest receiving node distances and (b) prefixes or complete addresses; (2) to perform lookup operations on at least one of said one or more data structures based on a destination address of a particular packet to identify a particular nearest receiving node distance; and (3) to either drop or forward the particular packet in response to determining whether or not the Time-To-Live (TTL) value of the particular packet provides for traversing at least as far as the particular nearest receiving node distance.

In one embodiment, each of the plurality of packets is a multicast packet. In one embodiment, the packet switching device includes a plurality of interfaces, and wherein said maintaining one or more data structures includes maintaining, on a per interface basis, said associations between (a) nearest receiving node distances and (b) prefixes or complete addresses. In one embodiment, the packet switching device includes a plurality of interfaces, and wherein said one or more data structures maintains a different nearest receiving node distance for at least two different interfaces of the plurality of interfaces for a same prefix or complete address. In one embodiment, said maintaining one or more data structures includes: updating said one or more data structures in response to receiving a particular message including a specific nearest receiving node distance for a specific prefix or complete address from another packet switching device or node communicatively coupled to the packet switching device. In one embodiment, said updating said one or more data structures is performed further in response to determining that a currently stored nearest receiving node distance for the specific prefix or complete address is greater than the specified nearest receiving node distance. One embodiment includes: increasing the specific nearest receiving node distance; and sending a message to another packet switching device, with the message including said increased specific nearest receiving node distance and the specific prefix or complete address. In one embodiment, each of the plurality of packets is a unicast packet.

One embodiment includes a packet switching device, comprising: means for maintaining associations between nearest receiving node distances and multicast addresses, said means for maintaining associations including means for updating said associations based on one or more messages received from one or more nodes or other packet switching devices including nearest receiving node distance information for one or more multicast addresses; means for updating one or more other packet switching devices with nearest receiving node distances for one or more multicast addresses; and means for determining whether or not to drop a received multicast packet based on the Time-To-Live (TTL) of the received multicast packet and the nearest receiving node distance associated with the multicast address of the received multicast packet.

In one embodiment, said means for updating one or more other packet switching devices with nearest receiving node distances for one or more multicast addresses includes means for including said nearest receiving node distances for one or more multicast addresses in one or more Protocol Independent Multicast (PIM) Join messages. In one embodiment, said means for maintaining said associations includes means for updating said associations based on one or more received PIM Prune messages. One embodiment includes a plurality of interfaces for sending and receiving packets, and wherein at least a plurality of said associations between nearest receiving node distances and multicast addresses are maintained on a per interface basis.

Figure 1A:
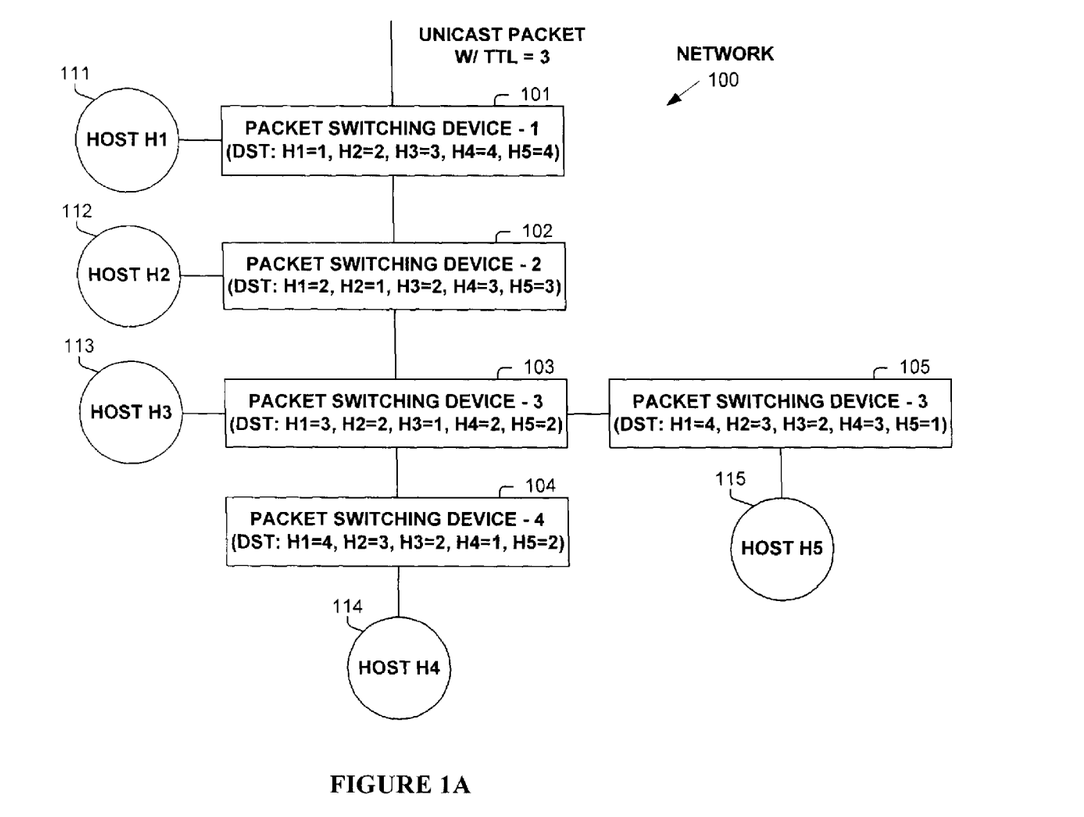
FIG. 1A illustrates an example network operating according to one embodiment.

Expressly turning to figures, FIG. 1A illustrates an example network 100 including packet switching devices 101-105, and hosts 111-115, with connectivity as shown (e.g., physical connectivity, shortest path connectivity, etc.). Each of packet switching devices 101-105 is annotated with a distance (e.g., hop count in this example) from the respective packet switching device 101-105 to reach each of hosts 111-115. For example, from packet switching device 101, the distance: to host 111 is one, to host 112 is two, to host 113 is three, to host 114 is four, and to host 115 is four.

To illustrate the operation of one embodiment, assume a unicast packet has arrived at packet switching device-1 101 with a destination address for host H5 115, and the arriving packet has a TTL of three. Packet switching device-1 101 reduces the TTL by one; thus, the current TTL of the packet is two. Prior art systems would forward the packet towards its destination of host H5 115, as the TTL is greater than zero.

However, in one embodiment, packet switching device-1 101 maintains an association between the destination address of host H5 115 and a nearest receiving node distance (which is four in example network 100). In one embodiment, the nearest receiving node distance is determined from a calculated routing tree (e.g., a shortest path first calculation); while in one embodiment, the nearest receiving node distance is determined by nodes distributing the information, such in a manner similar to that described herein in relation to multicast packets. Packet switching device-1 101 performs a lookup operation on the associations between destination addresses (e.g., prefixes or complete addresses) and nearest receiving node distances. Then, packet switching device-1 101 determines that the packet with a TTL of two will not reach host H5 115 (as it is a distance of four hops away) if it sends it out (as it will be dropped along the path towards its destination as it does not have enough TTL to reach it). Therefore, packet switching device-1 101 pre-drops the packet based on its TTL and the determined nearest receiving node distance (e.g., drops the packet despite have TTL remaining, but not enough to reach one or more subsequent intended destinations), and therefore, avoids the wasted consumption of bandwidth and other resources that would otherwise occur if the packet would have been forwarded by packet switching device-1 101.

Figure 1B:
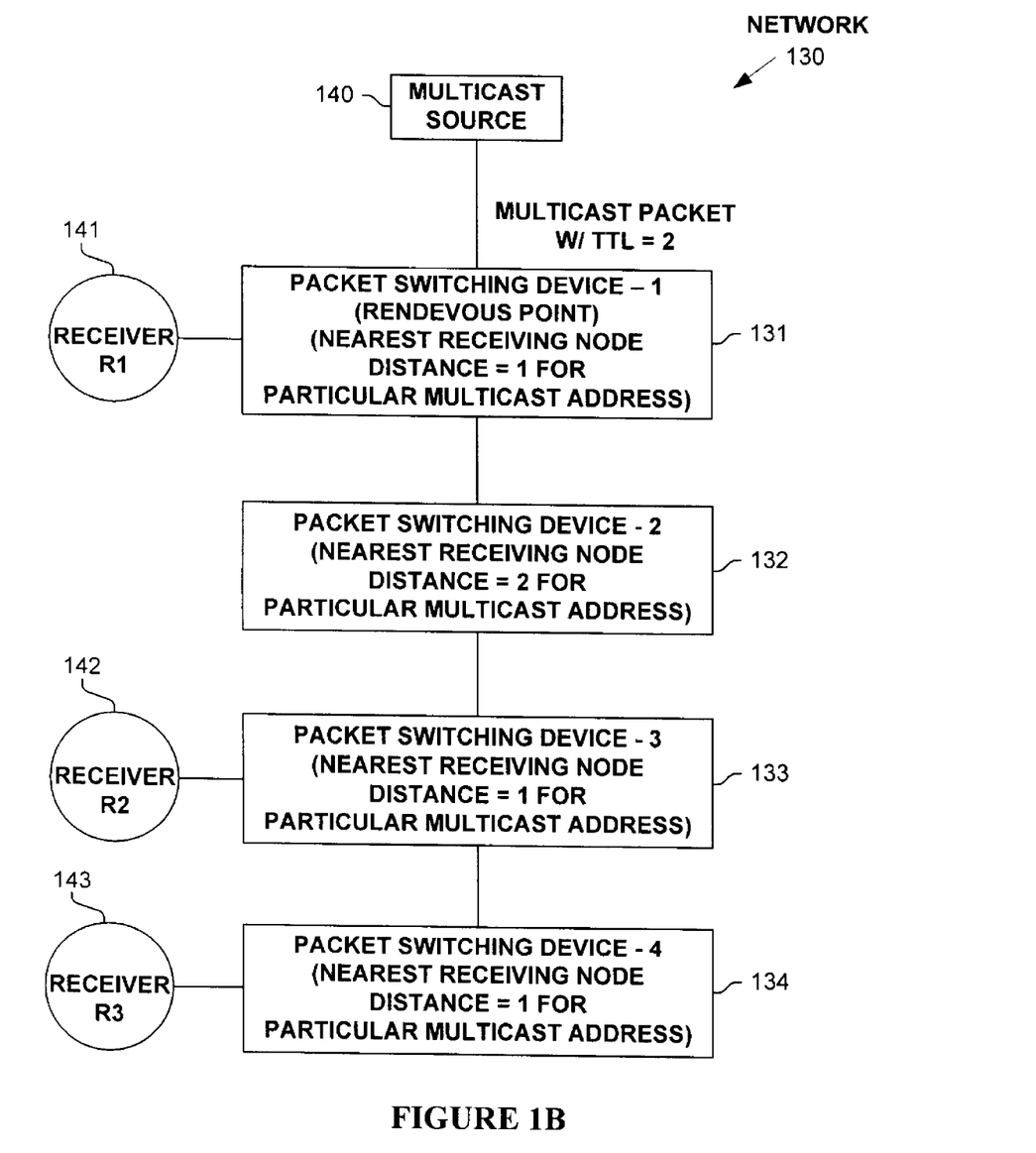
FIG. 1B illustrates an example network operating according to one embodiment.

FIG. 1B is used to illustrate another example, this time using network 130, which includes packet switching devices 131-134, a multicast source 140, and receivers 141-143 of the multicast service being sent from multicast source 140. In this example, each of packet switching devices 131-134 maintains an association between the multicast address corresponding to the multicast service and a nearest receiving node distance. Therefore, in example network 130: packet switching device 131 has a nearest receiving node distance of one (e.g., corresponding receiver 141) for the multicast service address; packet switching device 132 has a nearest receiving node distance of two (e.g., corresponding receiver 142) for the multicast service address; packet switching device 133 has a nearest receiving node distance of one (e.g., corresponding receiver 142) for the multicast service address; and packet switching device 134 has a nearest receiving node distance of one (e.g., corresponding receiver 143) for the multicast service address.

To illustrate the operation of one embodiment, assume a multicast packet has arrived at packet switching device-1 131 with a destination address of the multicast service, and the arriving packet has a TTL of three. Packet switching device-1 131 reduces the TTL by one; thus, the current TTL of the packet is two. As the multicast packet has enough TTL to reach at least one intended receiver (i.e., TTL is two, and nearest receiving node distance is one), packet switching device-1 131 forwards the multicast packet out both of the illustrated interfaces and is received by receiver 141 (which consumes it) and packet switching device-2 132. Packet switching device-2 132 receives the multicast packet and reduces its TTL by one, resulting in the multicast packet having a TTL of one. Packet switching device-2 132 retrieves the nearest receiving node distance (of two in this example) for the multicast address, and then drops the multicast packet as it does not have enough TTL to reach another intended receiver.

Figure 1C:
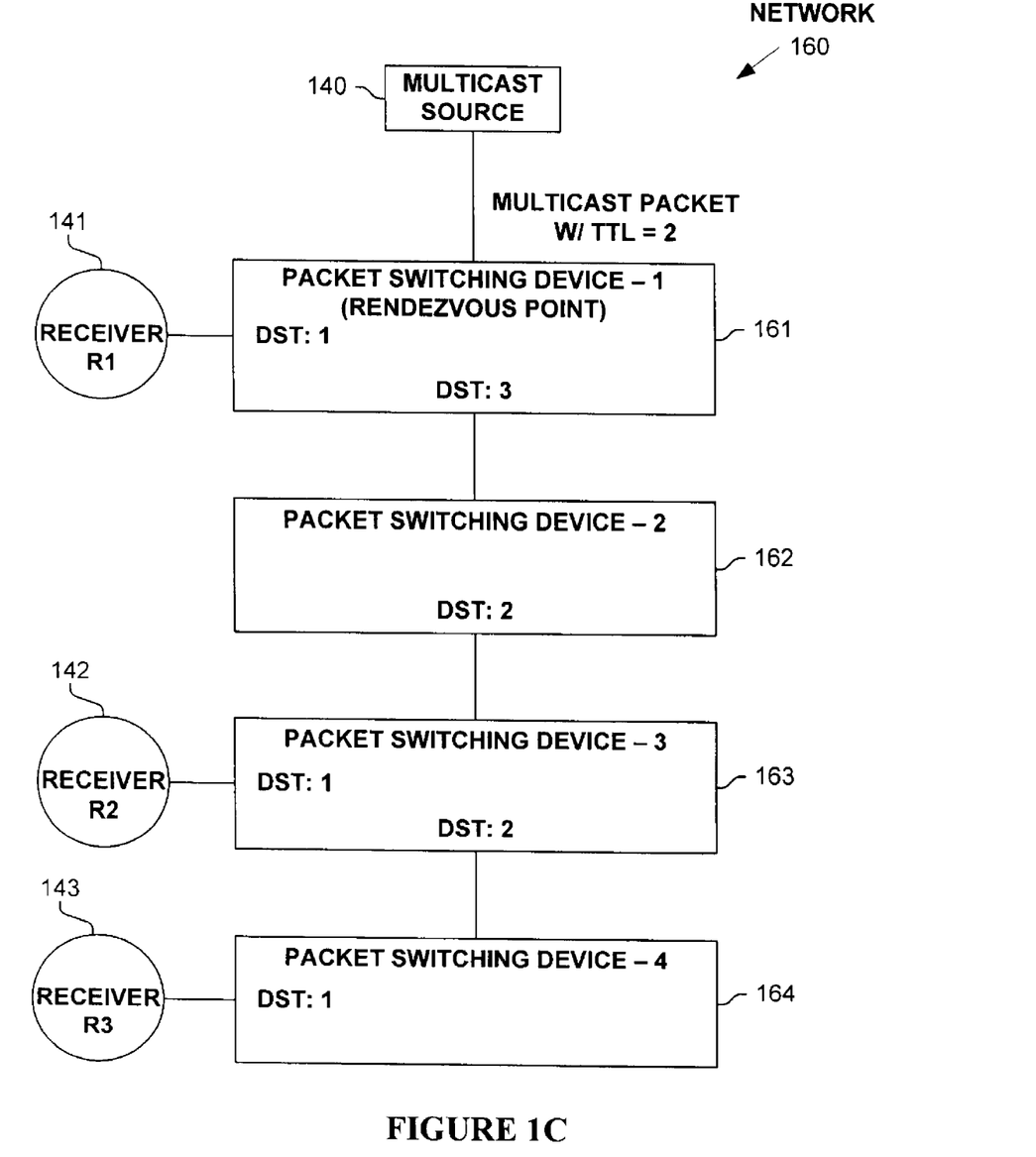
FIG. 1C illustrates an example network operating according to one embodiment.

FIG. 1C is used to illustrate another example, this time using network 160, which includes packet switching devices 161-164, a multicast source 140, and receivers 141-143 of the multicast service being sent from multicast source 140. This example is a variation of that described in relation in FIG. 1B, with the illustrated difference being that the associations between prefixes/complete addresses and nearest receiving node distances are maintained on a per interface basis. Therefore, interfaces of a same packet switching device may have a same or different nearest receiving node distance for a same prefixes/complete addresses. As shown, packet switching device 161 has nearest receiving node distances of one and three for its two illustrated interfaces; packet switching device 162 has a nearest receiving node distance of two for its illustrated interface; packet switching device 163 has nearest receiving node distances of one and two for its two illustrated interfaces; and packet switching device 164 has a nearest receiving node distance of one for its illustrated interface.

To illustrate the operation of one embodiment, assume a multicast packet has arrived at packet switching device-1 161 with a destination address of the multicast service, and the arriving packet has a TTL of three. Packet switching device-1 161 reduces the TTL by one; thus, the current TTL of the packet is two. As the multicast packet has enough TTL to reach at least one intended receiver from the interface leading to receiver R1 141 (i.e., TTL is two, and nearest receiving node distance is one), packet switching device-1 161 forwards the multicast packet out the interface leading to receiver R1 141. However, as the multicast packet does not have enough TTL to reach another intended receiver from its second interface (i.e., TTL is two, and nearest receiving node distance is three), the multicast packet is not forwarded from this second interface.

Figure 2A:
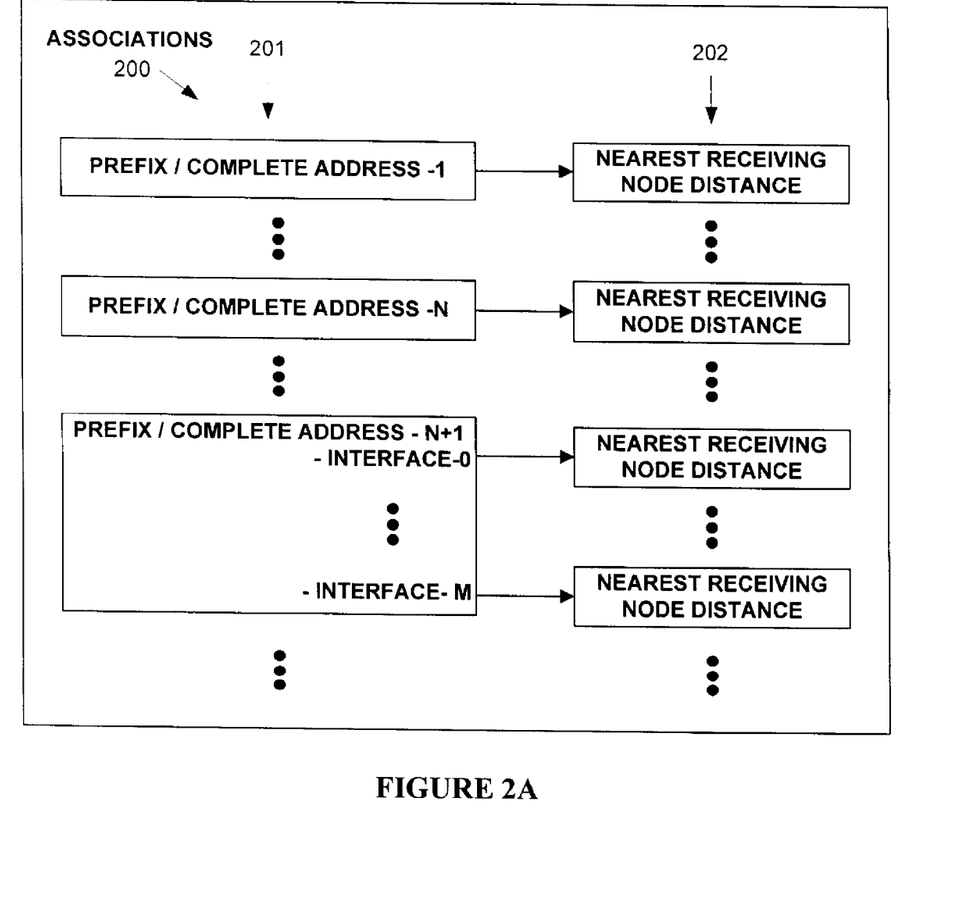
FIG. 2A illustrates example associations between prefixes or complete addresses and nearest receiving node distances used in one embodiment.

FIG. 2A illustrates associations 200 between prefixes/complete addresses 201 and nearest receiving node distances 202. In one embodiment, associations 200 between prefixes/complete addresses 201 and nearest receiving node distances 202 are stored on a packet switching device basis; while in one embodiment, associations 200 between prefixes/complete addresses 201 and nearest receiving node distances 202 are stored on a per interface basis in a packet switching device. In one embodiment, one or more data structures are used to store associations 200. In one embodiment, a content-addressable memory is used to store prefixes/complete addresses 201 with the nearest receiving node distances 202 stored in an adjunct memory for performing efficient lookup operations. In one embodiment, associations 200 are added to an existing data structure or lookup mechanism in a packet switching device, such as, but not limited to, that used for reverse path forwarding, access control list, or routing/forwarding operations (e.g., piggybacking on a lookup operation already being performed in the packet switching device).

Figure 2B:
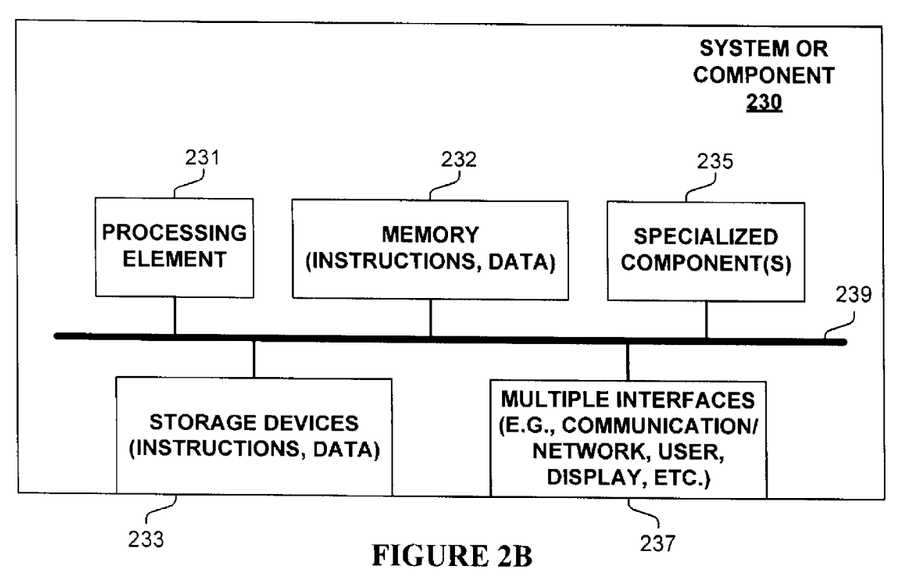
FIG. 2B illustrates an example system or component used in one embodiment.

FIG. 2B is block diagram of a system or component 230 used in one embodiment of packet switching device for performing pre-dropping of a packet if its Time-To-Live (TTL) value is not large enough to reach a destination. In one embodiment, system or component 230 performs one or more processes corresponding to one of the flow diagrams illustrated or otherwise described herein.

In one embodiment, system or component 230 includes a processing element 231, memory 232, storage devices 233, specialized component(s) 235 (e.g. optimized hardware such as for performing lookup operations, such as, but not limited to, including a content-addressable memory, etc.), and interface(s) 237 for communicating information (e.g., sending and receiving packets, user-interfaces, displaying information, etc.), which are typically communicatively coupled via one or more communications mechanisms 239, with the communications paths typically tailored to meet the needs of the application.

Various embodiments of component 230 may include more or less elements. The operation of component 230 is typically controlled by processing element 231 using memory 232 and storage devices 233 to perform one or more tasks or processes. Memory 232 is one type of computer-readable/computer-storage medium, and typically comprises random access memory (RAM), read only memory (ROM), flash memory, integrated circuits, and/or other memory components. Memory 232 typically stores computer-executable instructions to be executed by processing element 231 and/or data which is manipulated by processing element 231 for implementing functionality in accordance with an embodiment. Storage devices 233 are another type of computer-readable medium, and typically comprise solid state storage media, disk drives, diskettes, networked services, tape drives, and other storage devices. Storage devices 233 typically store computer-executable instructions to be executed by processing element 231 and/or data which is manipulated by processing element 231 for implementing functionality in accordance with an embodiment.

Figure 3:
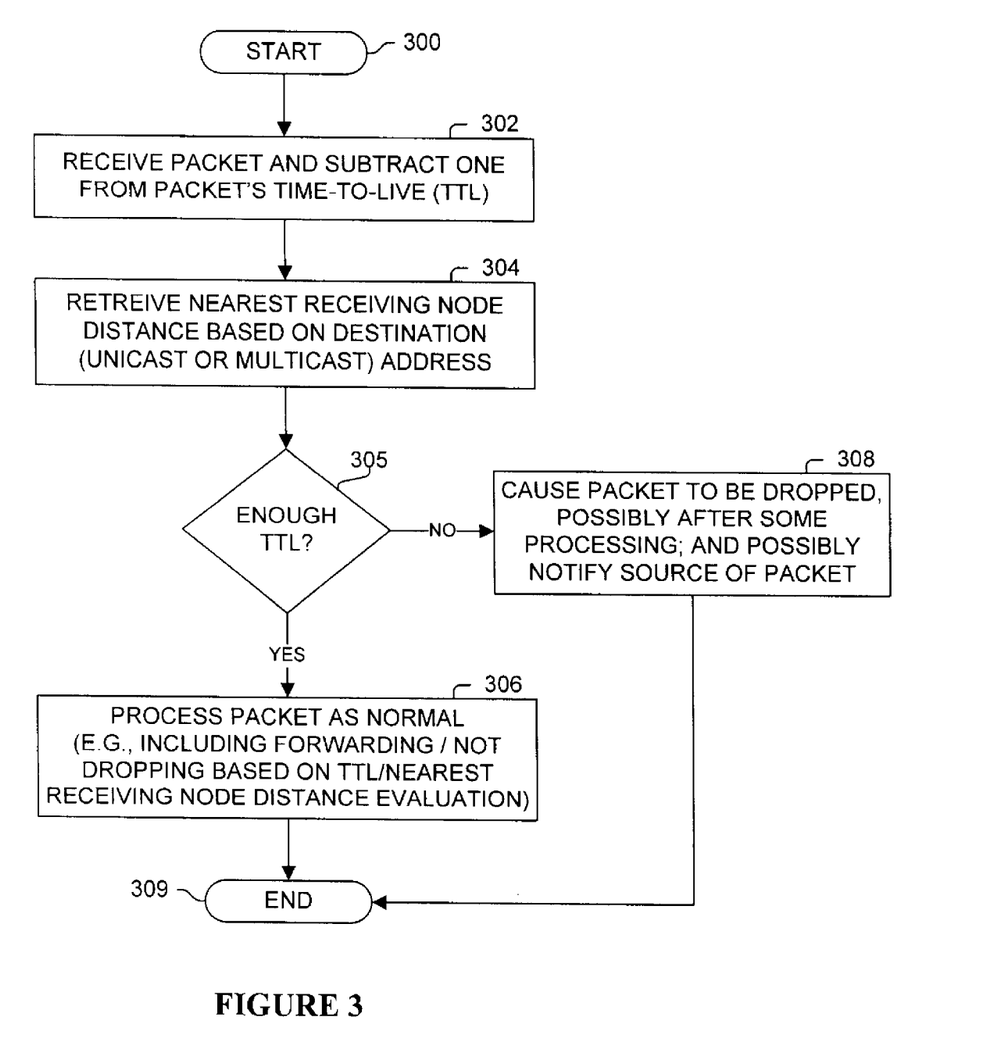
FIG. 3 illustrates a process for determining how to process a packet based on its corresponding nearest receiving node distance.

FIG. 3 illustrates a process for determining how to process a packet based on its corresponding nearest receiving node distance. Processing begins with process block 300. In process block 302, a packet is received and one is subtracted from the TTL of the packet. In process block 304, the nearest receiving node distance is retrieved (e.g., either for the packet switch, or for each interface that the packet is potentially from which to be sent). As determined in process block 305, in process block 306 the packet is processed normally as it has enough TTL for the stored nearest receiving node distance); otherwise, in process block 308, the packet is caused (e.g., dropped, marked to dropped) to be dropped, possibly after some processing (e.g., updating counters, sending the packet's source a message, etc.); and possibly sending a negative acknowledgment (e.g., an ICMP TTL drop message) to the source of the packet. Note, different embodiments may perform the operations in a different order. For example, the subtraction of one for the TTL may be done only if the packet is to be forwarded; and therefore, the nearest receiving node distances would be adjusted accordingly. Processing of the flow diagram is complete as indicated by process block 309.

Figure 4A:
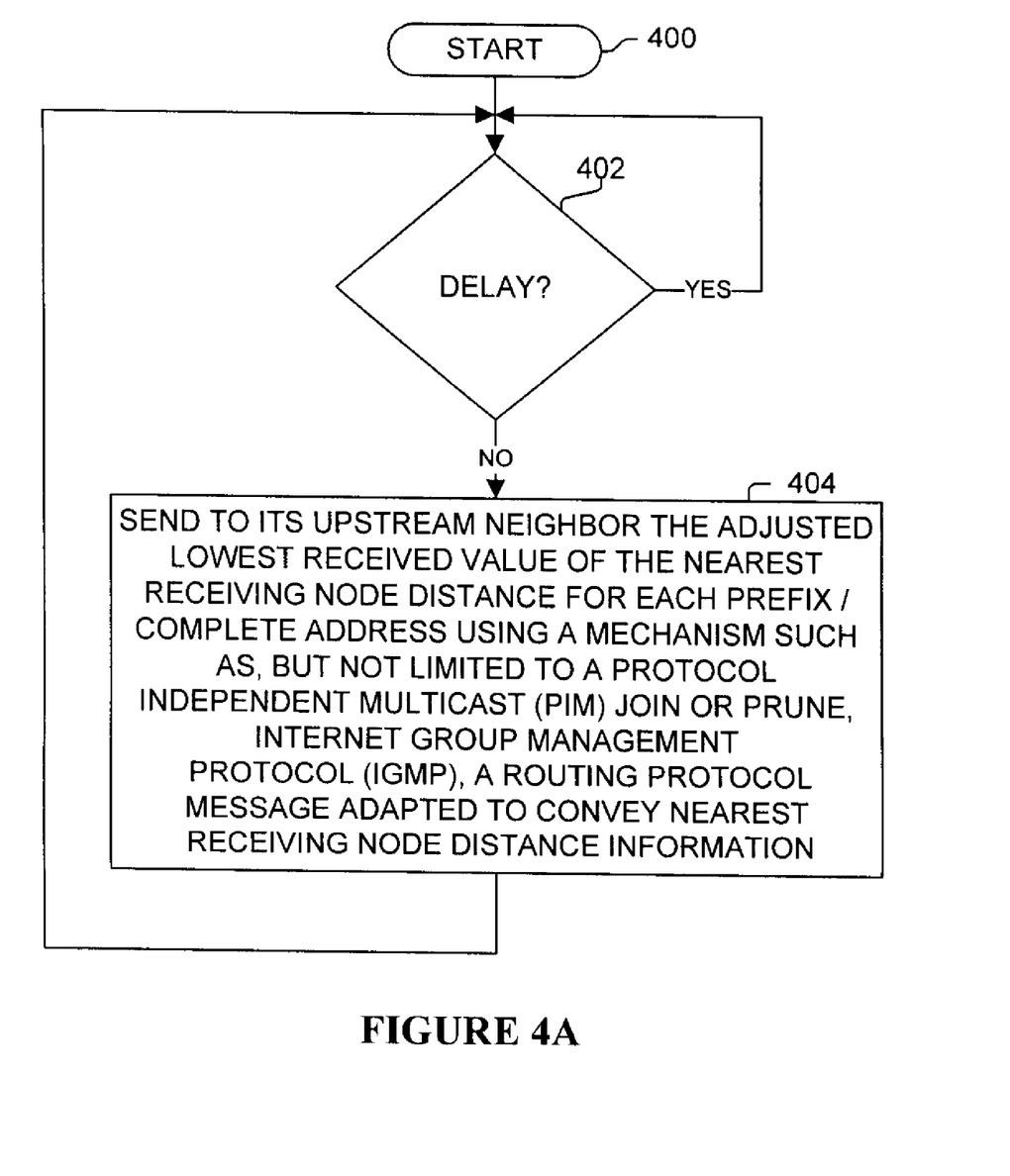
FIGS. 4A and 4B illustrate processes for maintaining associations between prefixes or complete addresses and nearest receiving node distances as performed in one embodiment.

FIG. 4A illustrates a process for maintaining associations between prefixes or complete addresses and nearest receiving node distances as performed in one embodiment that periodically sends the nearest receiving node distance to its upstream neighbor of a multicast service. Processing begins with process block 400. Process block 402 determines when it is time to send out the next message including the nearest receiving node distance information. When it is time to send out the next message, in process block 404, the network node sends to its upstream neighbor the adjusted lowest received value of the nearest receiving node distance for each prefix/complete address using a mechanism such as, but not limited to a Protocol Independent Multicast (PIM) Join or Prune, Internet Group Management Protocol (IGMP), a routing protocol message adapted to convey nearest receiving node distance information. Processing returns to process block 402.

Figure 4B:
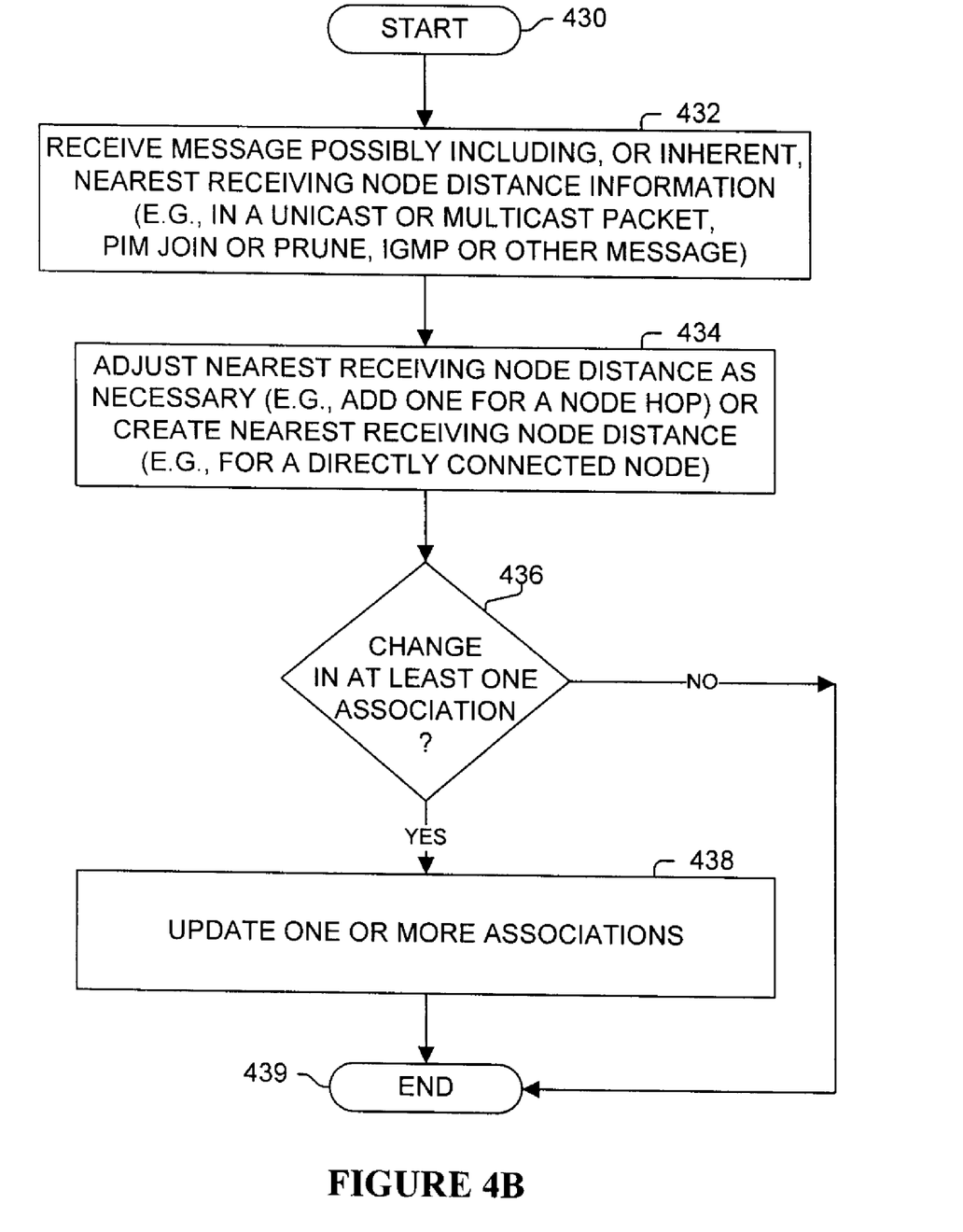

FIG. 4B illustrates a process for maintaining associations between prefixes or complete addresses and nearest receiving node distances as performed in one embodiment. Processing begins with process block 430. In process block 432, a message (e.g., unicast or multicast packet) is received which includes, explicitly or inherently, information pertaining to nearest receiving node distances, such as, but not limited to a Protocol Independent Multicast (PIM) Join or Prune, Internet Group Management Protocol (IGMP), a routing protocol message adapted to convey nearest receiving node distance information, or other message communicating such nearest receiving node distance information identified with its associated prefix/complete address. In process block 434, each of the nearest receiving node distances are adjusted as necessary, such as possibly adding one, as it is one hop further away from a receiver, or creating a nearest receiving node distance (e.g., setting the nearest receiving node distance to one for a directly connected receiver in response to an IGMP message). In other words, if the nearest receiving node distance is determined by a progressive message stream, typically each packet switching device and other node which decreases TTL when forwarding a packet, will increase each nearest receiving node distance by one in order to reflect that the nearest receiver is one further away. As determined in process block 436, if there is a change in at least one association between prefixes/completed addresses and nearest receiving node distances (e.g., a smaller nearest receiving node distance is determined, a prune operation is being performed on a node having the current nearest receiving node distance for a multicast address), then in process block 438, one or more associations between prefixes/completed addresses and nearest receiving node distance are updated.

For unicast packet traffic, there is only one intended receiver so the nearest receiving node distance is the distance away to reach that node. Again, this nearest receiving node distance information can be communicated in an extensible number of ways, such as, but not limited to, configuration information, specialized messages, determined by topology computations, included in routing updates.

In one embodiment using multicast traffic, multicast packets get forwarded using (*,G) or (S,G) entries, i.e. by using the shared tree or source tree respectively. The typical multicast model is one where receivers indicate their interest in a multicast group by sending an IGMP Join for the group, and senders send to this multicast group. The traffic gets forwarded using different models like PIM-SM, PIM-DM or Bidir to various receivers for the same group/channel. The last hop router is the one which receives the IGMP Join and sends a PIM Join upstream to the RP (Rendezvous point). In the Last hop router, the "C" flag (Connected) would be set for the multicast state created, indicating a directly connected receiver is present on this node. PIM Join messages are sent through the network to the RP. The Join messages mainly contain information about the group/channel for which the Join is being sent upstream towards the RP. In one embodiment, the PIM Join messages and PIM Prune messages (e.g., encoded in the reserve bits) include nearest receiving node distance information.

When an IGMP Join comes from a host or L2 packet switching device, a (*,G) entry would be formed in the packet switching device with the C flag set to indicate a directly connected receiver. The nearest receiving node distance is set to one for the multicast address, in order to reflect a directly connected receiver. The triggered PIM Join message sent towards the RP will include one or more associations between prefixes/complete addresses and nearest receiving node distances (e.g., reflecting the directly connected receiver and possibly other communicatively coupled receivers). When a upstream router receives a PIM Join, it typically increases the nearest receiving node distances by one each, and updates its associations between prefixes/complete addresses and nearest receiving node distance as required. If a PIM Join message reflects an updated nearest receiving node distance for a prefixes/complete addresses (e.g., a multicast address) that is greater than or equal to the one currently maintained (e.g., as described in relation to FIG. 2A), then the corresponding association is not updated as a closer receiver has not been identified for the multicast address. However, if a PIM Join message reflects an updated nearest receiving node distance for a prefixes/complete addresses (e.g., a multicast address) that is less than the one currently maintained (e.g., as described in relation to FIG. 2A), then the corresponding association is updated as a closer receiver has been identified for the multicast address.

In regards to PIM Prune messages removing receivers from a service identified by a multicast address, the Prune messages may include nearest receiving node distance progressively increased as the Prune message traverses the network towards the RP; and the maintained associations between prefixes/complete addresses and nearest receiving node distance are updated as required. In one embodiment, if the Prune message identifies an updated nearest receiving node distance that is equal to the one maintained for the multicast address in the packet switching device, then the corresponding association is simply removed (as there may only be one receiver at that distance—the one being removed), as it will be updated by a subsequent PIM Join message (which, in one embodiment, are typically sent every thirty seconds or so). In one embodiment, a count is maintained to track the number of receiving nodes at the nearest receiving node distance, so it can be readily determined whether or not to remove an association based on a Prune message corresponding to the current nearest receiving node distance for the multicast address. If, however, the Prune message reflects an updated nearest receiving node distance greater than that currently maintained for the multicast address, the maintained association does not need to be updated (as there Prune is not removing one of the nearest receivers).

Processing of the flow diagram illustrated in FIG. 4 is complete as indicated by process block 439.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a packet switching device, the method comprising:
   maintaining, in the packet switching device, associations between (a) nearest receiving node distances and (b) prefixes or complete addresses; and
   for each particular packet of a plurality of packets:
      (a) receiving the particular packet, including a particular Time-To-Live (TTL) and a particular destination address in the header of the particular packet;
      (b) determining a particular nearest receiving node distance based on the particular destination address, which includes performing a lookup operation on said associations based on the particular destination address; and
      (c) in response to determining whether or not the particular TTL is large enough for the particular packet to reach at least one destination node based on the particular nearest receiving node distance: causing the particular packet to be forwarded if said determination was that the particular TTL is large enough for reaching at least one destination node, else causing the particular packet to be dropped;
   wherein each of the plurality of packets is a multicast packet; and
   wherein the particular nearest receiving node distance for an identifiable packet of the plurality of packets is the least of at least two different distances to at least two different intended receivers of the identifiable packet.

2. The method of claim 1, wherein the packet switching device includes a plurality of interfaces, and wherein one or more of said maintained associations are maintained on a per interface basis.

3. The method of claim 1, wherein the packet switching device includes a plurality of interfaces, and wherein the packet switching device associates a different nearest receiving node distance for at least two different interfaces of the plurality of interfaces for a same prefix or complete address.

4. The method of claim 1, wherein said maintaining associations includes: updating said associations in response to receiving a particular message including a specific nearest receiving node distance for a specific prefix or complete address from another packet switching device or node communicatively coupled to the packet switching device.

5. The method of claim 4, wherein said updating said associations is performed further in response to determining that a currently stored nearest receiving node distance for the specific prefix or complete address is greater than the specified nearest receiving node distance.

6. The method of claim 4, comprising: increasing the specific nearest receiving node distance; and sending a message to another packet switching device, with the message including said increased specific nearest receiving node distance and the specific prefix or complete address.

7. A packet switching device, comprising:
   one or more computer-readable memory; and
   one or more processors configured: (1) to maintain one or more data structures stored in the packet switching device in said one or more computer-readable media, said one or more data structures including associations between (a) nearest receiving node distances and (b) prefixes or complete addresses; (2) to perform lookup operations on at least one of said one or more data structures based on a destination address of a particular packet to identify a particular nearest receiving node distance; and (3) to either drop or forward the particular packet in response to determining whether or not the Time-To-Live (TTL) value of the particular packet provides for traversing at least as far as the particular nearest receiving node distance;

wherein each of the plurality of packets is a multicast packet; and wherein the particular nearest receiving node distance for the particular packet is the least of at least two different distances to at least two different intended receivers of the particular packet.

8. The packet switching device of claim 7, wherein the packet switching device includes a plurality of interfaces, and wherein said maintaining one or more data structures includes maintaining, on a per interface basis, said associations between (a) nearest receiving node distances and (b) prefixes or complete addresses.

9. The packet switching device of claim 7, wherein the packet switching device includes a plurality of interfaces, and wherein said one or more data structures maintains a different nearest receiving node distance for at least two different interfaces of the plurality of interfaces for a same prefix or complete address.

10. The packet switching device of claim 7, wherein said maintaining one or more data structures includes: updating said one or more data structures in response to receiving a particular message including a specific nearest receiving node distance for a specific prefix or complete address from another packet switching device or node communicatively coupled to the packet switching device.

11. The packet switching device of claim 10, wherein said updating said one or more data structures is performed further in response to determining that a currently stored nearest receiving node distance for the specific prefix or complete address is greater than the specified nearest receiving node distance.

12. The packet switching device of claim 10, comprising: increasing the specific nearest receiving node distance; and sending a message to another packet switching device, with the message including said increased specific nearest receiving node distance and the specific prefix or complete address.

13. A packet switching device, comprising:
means for maintaining associations between nearest receiving node distances and multicast addresses, said means for maintaining associations including means for updating said associations based on one or more messages received from one or more nodes or other packet switching devices including nearest receiving node distance information for one or more multicast addresses;
means for updating one or more other packet switching devices with nearest receiving node distances for one or more multicast addresses; and
means for determining whether or not to drop a received multicast packet based on the Time-To-Live (TTL) of the received multicast packet and the nearest receiving node distance associated with the multicast address of the received multicast packet;
wherein the nearest receiving node distance is defined as an actual determined distance from the packet switching device to a closest intended receiver of said received multicast packet;
wherein the particular nearest receiving node distance for said received multicast packet is the least of at least two different distances to at least two different intended receivers of said received multicast packet.

14. The packet switching device of claim 13, wherein said means for updating one or more other packet switching devices with nearest receiving node distances for one or more multicast addresses includes means for including said nearest receiving node distances for one or more multicast addresses in one or more Protocol Independent Multicast (PIM) Join messages.

15. The packet switching device of claim 14, wherein said means for maintaining said associations includes means for updating said associations based on one or more received PIM Prune messages.

16. The packet switching device of claim 13, including a plurality of interfaces for sending and receiving packets, and wherein at least a plurality of said associations between nearest receiving node distances and multicast addresses are maintained on a per interface basis.

17. The packet switching device of claim 13, wherein the nearest receiving node distance is defined as an actual determined distance from the packet switching device to a closest intended receiver of said received multicast packet.

18. The method of claim 1, wherein the nearest receiving node distance is defined as an actual determined distance from the packet switching device to a closest intended receiver of the particular packet.

19. The packet switching device of claim 7, wherein the nearest receiving node distance is defined as an actual determined distance from the packet switching device to a closest intended receiver of the particular packet.

* * * * *